United States Patent [19]
Kühn et al.

[11] Patent Number: 6,073,496
[45] Date of Patent: Jun. 13, 2000

[54] LOAD HOISTING APPARATUS

[75] Inventors: Robert Kühn, Reimlingen; Wolfgang A. Bittenbinder, Utzmemmingen, both of Germany

[73] Assignee: Mannesmann AG, Düsseldorf, Germany

[21] Appl. No.: 09/144,814

[22] Filed: Sep. 1, 1998

Related U.S. Application Data

[63] Continuation-in-part of application No. 08/806,382, Feb. 27, 1997, abandoned.

[30]     Foreign Application Priority Data

Mar. 14, 1996 [DE] Germany ........................ 296 04 729 U

[51] Int. Cl.$^7$ ........................................... G01L 5/00
[52] U.S. Cl. ..................... 73/862.56; 73/862.57
[58] Field of Search ................ 73/862.56, 862.57, 73/862.53

[56]             References Cited

U.S. PATENT DOCUMENTS

| | | | |
|---|---|---|---|
| 2,836,062 | 5/1958 | Wells | 73/862.56 |
| 3,762,755 | 10/1973 | Saether | 294/67.21 |
| 3,827,514 | 8/1974 | Bradley | 73/862.56 |
| 3,866,200 | 2/1975 | Paredes et al. | 340/267 |
| 3,911,737 | 10/1975 | Ormond . | |
| 3,917,200 | 11/1975 | Johnson . | |
| 4,058,178 | 11/1977 | Shinohara et al. | 73/862.542 |
| 4,076,215 | 2/1978 | Lander et al. | 254/93 |
| 4,140,010 | 2/1979 | Kulpmann et al. | 73/862.56 |
| 4,309,911 | 1/1982 | McCall . | |
| 4,697,798 | 10/1987 | Pitter et al. | 73/862.56 |
| 5,152,183 | 10/1992 | Munzebrock | 73/862.56 |
| 5,260,688 | 11/1993 | Curry et al. | 340/673 |
| 5,711,382 | 1/1998 | Hansen et al. | 175/52 |
| 5,800,000 | 9/1998 | Shockley | 294/81.3 |

FOREIGN PATENT DOCUMENTS

| | | |
|---|---|---|
| 29 31 927 A1 | 2/1981 | Germany . |
| 34 15 269 A1 | 11/1984 | Germany . |
| 85 29 994 U1 | 1/1986 | Germany . |
| 38 08 121 A1 | 9/1989 | Germany . |
| 89 07 618 U1 | 12/1989 | Germany . |
| 38 32 968 A1 | 4/1990 | Germany . |
| 91 02 348 U1 | 7/1991 | Germany . |
| 91 12 755 U1 | 4/1992 | Germany . |
| 41 21 334 A1 | 1/1993 | Germany . |
| 22 49 044 | 4/1993 | Germany . |

*Primary Examiner*—Max Noori
*Attorney, Agent, or Firm*—Henry M. Feiereisen

[57]             ABSTRACT

A hoisting apparatus, includes a handle positioned above a load-engaging member for grabbing by an operator to manually move and guide a load, a lifting mechanism positioned above the handle and operatively connected to the handle via a flexible transmission member, and a control unit for adjusting a lifting force generated by the lifting mechanism. Accommodated in the handle is a load sensor which is connected to the handle and the load-engaging member and outputs to the control unit a signal commensurate with a tensile stress of the load sensor when an operator grabs the handle and lifts or lowers the load whereby the control unit so controls the lifting mechanism that the lifting force is increased during lifting of the load in correspondence to an increasing tensile stress of the load sensor until the lifting force corresponds to a weight force of the load and the load is kept in balance, and that the lifting force is decreased to zero in correspondence to a decreasing tensile stress of the load sensor when placing the load on a support surface.

35 Claims, 4 Drawing Sheets

LOAD HOISTING APPARATUS

CROSS-REFERENCES TO RELATED APPLICATIONS

This application is a continuation-in-part of prior filed copending patent application, Ser. Appl. No. 08/806,382, filed Feb. 27, 1997, now abandoned.

BACKGROUND OF THE INVENTION

The present invention refers generally to a load hoisting apparatus, and in particular to a load hoisting apparatus for allowing manual maneuvering of a load, having a handle connected to the load via a load-engaging member, and a lifting mechanism for compensating the weight force of the load.

In conventional load hoisting devices, a load sensor is positioned between the lifting mechanism and the load-engaging member for transmitting an electric signal commensurate with a registered load value to a control unit to so operate the hoisting apparatus that the load is maintained in balance. Typically, the handle, which is designed in the form of a grip, and the load sensor form separate structural components, with the handle being situated, as viewed in direction of the force flow, either immediately above the load sensor, or projecting laterally out from an upper area of the load-measuring unit that includes the load sensor.

These types of conventional load hoisting devices are disadvantageous in several aspects. A superimposed disposition of the load sensor and the handle results in an increase of the distance between the handle and the load-engaging member so that the possible lifting height is decreased and the operator must apply greater forces in order to swing the load about a horizontal axis. In case the handle projects laterally outwards from the load measuring unit, a lifting or lowering of the load results in a tilting motion of the load so that as a consequence of inertia a recoil action is experienced that leads to faulty signals when compensating the weight force and to error commands from the control system.

SUMMARY OF THE INVENTION

It is an object of the present invention to provide an improved load hoisting apparatus, obviating the afore-stated drawbacks.

In particular, it is an object of the present invention to provide an improved hoisting apparatus which allows automatic balancing of a load so as to enable an operator to manually maneuver the load as well as sensitively move and guide the load and which exhibits small dimensions and is substantially free of any recoil action.

These objects, and others which will become apparent hereinafter, are attained in accordance with the present invention by providing a handle which is positioned above a load-engaging member for grabbing by an operator to manually move and guide a load, a lifting mechanism positioned above the handle and operatively connected to the handle via a flexible transmission member, a control unit for adjusting the lifting force of the lifting mechanism, and a load sensor accommodated in the handle and connected to the handle and the load-engaging member for outputting to the control unit a signal commensurate with a tensile stress of the load sensor, with the control unit so controlling the lifting mechanism that during lifting of the load the lifting force is increased in correspondence to an increasing tensile stress of the load sensor until the lifting force corresponds to a weight force of the load and the load is kept in balance, and the lifting force is decreased to zero in correspondance to a decreasing tensile stress of the load sensor when placing the load on a support surface.

A hoisting apparatus according to the present invention is a special type of hoisting apparatus because the lifting mechanism generates a lifting force to equalize the weight force of the load but does not lift the load per se. Thus, the operator is not only able to move and guide the load but in effect is capable of manually lifting and lowering the load by using the handle. The load is merely kept in suspension by the lifting mechanism so that the operator needs to apply only minimal forces to maneuver the load.

The arrangement of the load sensor inside the handle results in a substantially recoil-free lifting and lowering of the load to enable the operator to sensitively maneuver and position the load via the handle, and in a compact design of minimal overall height of the hoisting apparatus so as to ensure a greatest possible working lift. The coaxial arrangement of handle, load sensor and line of action of the load eliminates the provision of geometric levers so that recoil effects on the load sensor as a consequence of inertia are prevented during lift.

Suitably, the handle is formed by a hollow body, e.g. a cylindrical pipe, that encloses the load sensor, thereby effecting a stable configuration of the handle.

According to another feature of the present invention, the handle includes a head piece securely fixed at the upper end of the hollow body, and a carriage arranged in proximity of the lower end of the hollow body for displacement in direction of the longitudinal axis relative to the hollow body, with the load sensor extending between and secured to the head piece and the carriage. Preferably, the load sensor is articulated to both the head piece and the carriage to thereby effect a high degree of measuring accuracy as the load sensor is not subject to external forces and moments but is capable of measuring only the axial force applied by the load on the handle. In order to enable the load sensor to measure the axial force applied by the load free from any loss, the carriage is supported within the handle by a bearing, e.g. a rolling-contact bearing, to minimize friction.

In order to enable the operator to manually maneuver the load also after releasing the handle, the lifting force of the lifting mechanism is adjustable by a default value which is stored in a holding circuit. The holding circuit can be switched between a "normal" operating mode and a "hold" operating mode by a switch arranged on the handle, whereby in the normal operating mode the control unit continuously feeds the holding circuit with a new default value in response to the actual tensile stress that acts on the load sensor, and whereby in the other hold operating mode the default value being received last from the control unit and then stored is retained in the memory until the holding circuit is switched to the normal operating mode. In the "hold" operating mode, the operator can release the handle and manually grab the load for subsequent maneuvering. This is especially advantageous when accurate placement of the load is desired.

According to another feature of the present invention, the carriage is captivated within the handle so as to be prevented from being expelled downwardly out of the handle when e.g. the load sensor ruptures. The captivation of the carriage can be effected in a variety of ways. For example, the handle may have incorporated therein in proximity of the lower end a collar which projects radially inwards to exhibit an inner diameter which is smaller than the outer diameter of the carriage. Such a collar can be realized by a ring which is received in a circumferential groove in the inside wall surface of the handle.

In accordance with another feature of the present invention a safety mechanism is provided to prevent the carriage from being pushed too far into the handle and thereby eliminate any risk of upsetting the load sensor. The safety mechanism includes a bolt traversing the handle and extending across a recess formed in the carriage, with the bolt being positioned at a small axial distance to an opposite stop surface of the carriage. Thus, the upward displacement of the carriage is restricted to the size of the axial distance between the stop surface and the bolt.

In particular in situations when a heavy loads is suspended, frictional forces are encountered in the lifting mechanism that have to be overcome by the operator to effectively lift the load. Therefore, the hoisting apparatus according to another feature of the present invention has incorporated therein a switching mechanism which generates a slight overcompensation of the weight force of the load during lifting and a slight undercompensation during lowering of the load. The switching mechanism interacts with a spring-loaded sheath that encloses the handle by monitoring the displacement of the sheath relative to the handle in opposition to the spring elements that act on the sheath from both axial directions. When the force applied on the handle by the operator for lifting and maneuvering the load exceeds a predetermined level, i.e. the sheath is displaced by the operator too far into an off-center disposition, the switching mechanism sends a signal to the control unit to thereby instruct the lifting mechanism to increase the lifting force during lifting operation and to reduce the lifting force during lowering operation.

A switching mechanism of this type can simply be realized by providing an operating pin which is supported by the sheath and extends radially through an axial oblong hole in the hollow body of the handle, and a switch element which is triggered by the operating pin when the sheath travels into either one of the off-center dispositions.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
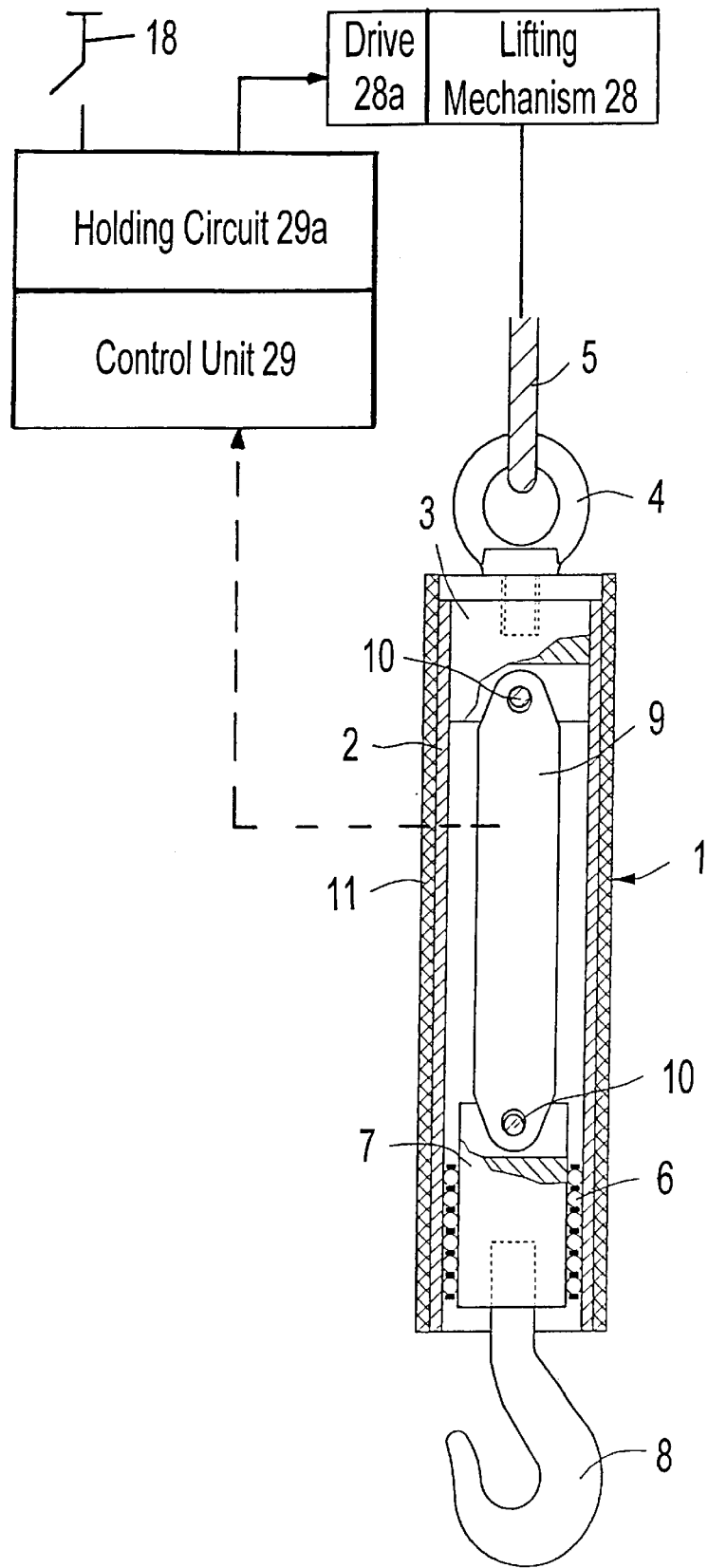
FIG. 1 is a fragmentary, partially sectional longitudinal view of one embodiment of a hoisting apparatus according to the present invention, and showing by way of a schematic block diagram of a control system for operating the lifting mechanism.

Throughout all the Figures, the same or corresponding elements are generally indicated by the same reference numerals.

Turning now to the drawing, and in particular to FIG. 1, there is shown a fragmentary, partially sectional longitudinal view of one embodiment of a hoisting apparatus according to the present invention for maintaining a load in balance for easy manipulation by an operator. The hoisting apparatus includes a grip portion or handle, generally designated by reference numeral 1 and having a hollow body 2 in the form of a cylindrical pipe. The hollow body 2 has opposite axial ends, with the upper axial end having secured therein a head piece 3 which is formed at it outside surface with an eyelet 4 for attachment of one end of a flexible traction member in the form of a rope 5. The other end of the rope 5 is connected to a lifting mechanism 28 which includes a drive unit 28a and is depicted only schematically for sake of simplicity. In proximity to its lower axial end, the hollow body 2 accommodates a carriage 7 which is guided within the hollow body 1 for displacement in an axial direction. The carriage 7 is supported against the inside wall surface of the hollow body 2 by a rolling-contact bearing having rolling elements 6 which are interposed between the carriage 7 and the surrounding inside wall of the hollow body. At the head-distant end, the carriage 7 carries a load-engaging member 8 in the form of a hook.

Placed between the head piece 3 and the carriage 7 is a load sensor 9 which is hingedly connected to the eyelet-distal side of the head piece 3 and the hook-distal side of the carriage 7 by bolts 10. The load sensor 9 is provided in the form of a tension band which includes a strain gage for outputting signals in response to a load suspended from the hook 8.

The hollow body 2 is enclosed by a sheath 11 which is made of polymer material such as Teflon or rubber, and exhibits an antiskid surface profile to improve handling of the grip 1.

At operation, when a load is suspended from the hook 8, the load sensor 9 outputs a signal commensurate with the weight of the load. This signal is transmitted to a control unit 29 to so operate the drive unit 28a that the lifting force applied by the lifting mechanism 28 equalizes the weight force of the load to thereby keep the load in suspension or balance. The operator can simply grasp the handle 1 to manually move the load and lift or lower the handle 1 to move the load in a substantially force-free and effortless manner.

The weight force of the load is equalized and adjustment of the lifting force is triggered as soon as the operator grabs the handle 1 and lifts the load. As the operator applies a force on the handle 1 to lift the load, the load sensor 9 is subject to a tensile stress and produces a signal proportional to the tensile stress of the load sensor 9. This signal is sent to the control unit 29 for outputting a corresponding command to adjust the respective lifting force applied by the lifting mechanism 28. The increased lifting force in turn causes an increase of the tensile stress on the load sensor 9 which again is registered by the control unit 29. This interaction continues and the lifting force is increased in response to the increasing tensile stress on the load sensor until the lifting force corresponds to the weight force of the load and the load is kept in suspension.

When putting down or placing the load onto a support surface, the lifting force is decreased in accordance with the decreasing tensile stress of the load sensor until the lifting force reaches zero. Thus, the applied lifting force is completely negated when putting down the load.

Figure 2:
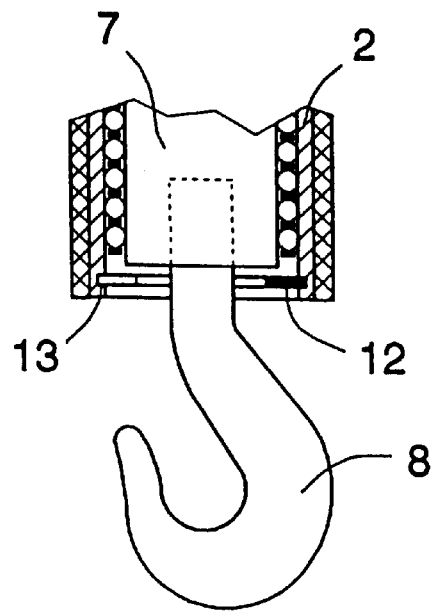
FIG. 2 is a detailed, partially sectional longitudinal view of a modified hoisting apparatus, equipped with a capture mechanism to limit a movement of the carriage in downward direction.

In order to prevent the carriage 7 from being expelled downwards out of the hollow body 2 in the event the load sensor 9 is ruptured, a capture mechanism in form of a ring 12 is provided which is press-fitted in a circumferential groove 13 in the inside wall of the hollow body 2, as shown in FIG. 2. The ring 12 has an inside diameter which is smaller than the outside diameter of the carriage so that a downward movement of the carriage 7 is stopped by the ring 12 to thereby ensure a safe retention of the carriage 7 within the hollow body 2.

Figure 3:
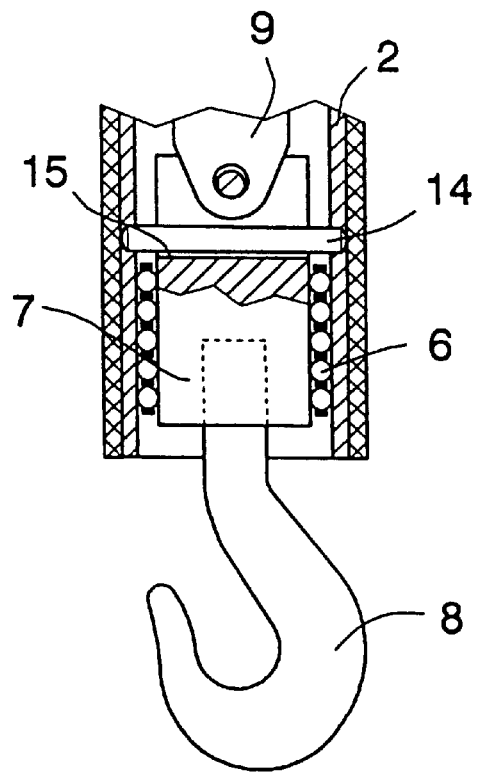
FIG. 3 is a detailed, partially sectional longitudinal view of a modified hoisting apparatus, equipped with a safety mechanism to limit a movement of a carriage in upward direction.

FIG. 3 shows a safety mechanism to prevent the carriage 7 from being pushed excessively into the hollow body 2 and to thereby cause an upsetting or compression of the load sensor 9. The safety mechanism includes a bolt 14 which traverses the hollow body 2 across a recess formed laterally on the carriage 7 at a slight distance to an opposing stop surface 15 that constitutes the base of the recess of the carriage 7. If e.g. the load is placed carelessly on a surface, the hook 8 is acted upon by an upward, vertical force that tends to push the carriage 7 upwardly only until the stop surface 15 impacts the bolt 14. Thus, the carriage 7 is prevented from excessively compressing and damaging the sensor 9. Additionally, as the bolt 14 is secured in place in opposite bores of the hollow body 2 and extends across the recess in the carriage 7, the carriage 7 is also secured against rotation so that generation of torsional forces is eliminated that can damage the load sensor 9.

Figure 4:
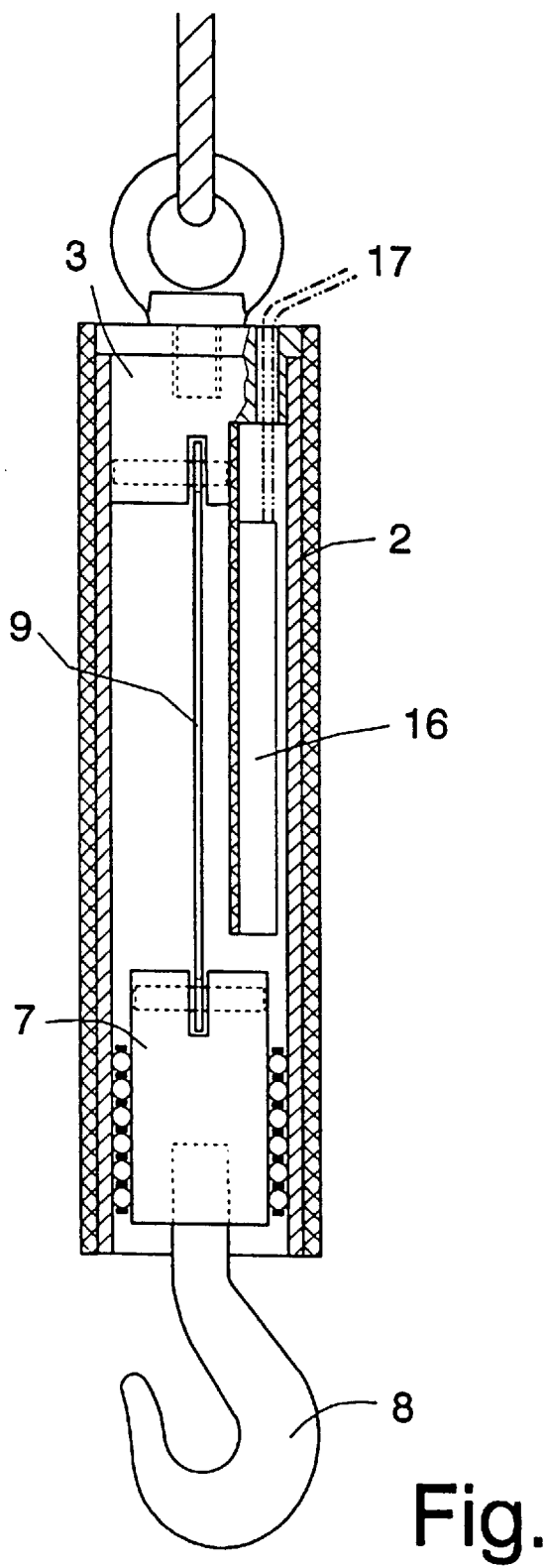
FIG. 4 is a fragmentary, partially sectional longitudinal view of a modified hoisting apparatus, equipped with an amplifier for reinforcing a signal transmission.

As described above, the load sensor 9 transmits an electric signal to the control unit 29 in response to an attachment of a load to the hook 8 for suitably controlling the lifting mechanism 28. In some cases, it may be advisable to amplify this electric signal. Accordingly, as shown in FIG. 4, the hollow body 2 may accommodate an amplifier 16 which is arranged laterally along the inside wall of the hollow body 2 and transmits the signal outputted from the load sensor 9 via a signal line 17 to the control unit 29.

Figure 5:
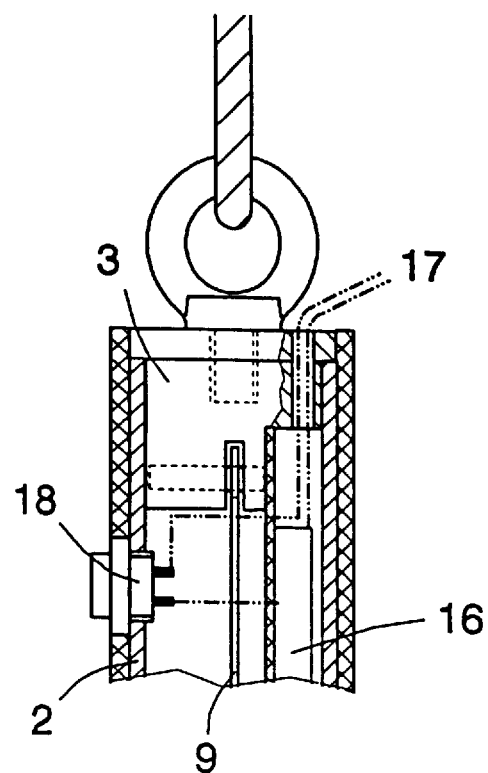
FIG. 5 is a detailed, partially sectional longitudinal view of another modification of the hoisting apparatus, equipped with a switch for controlling the operating mode of a holding circuit.

As shown in FIG. 5, the hoisting apparatus includes a switch 18 which is positioned in the upper area of the handle 1 and, when actuated by the operator, maintains the lifting force applied last by the lifting mechanism 28 via the control unit 29 unaltered, i.e. any change of the tensile stress on the load sensor 9 will not be registered and does not result in a variation of the applied lifting force. Thus, the operator is able to release the handle and e.g. grab the load underneath the handle in order to maneuver the load to a desired position. In particular in connection with large or bulky loads, the provision of such a switch 18 is advantageous because the operator can directly grab the load and guide it carefully and accurately to the intended site and thereby realize a precise positioning of the load, e.g. when depositing the load in a device or other processing machine.

The switch 18 cooperates with the control unit 29 and the lifting mechanism 28 in a manner indicated schematically by way of a block diagram in FIG. 1, through integration in the control unit 29 of a holding circuit 29*a*, e.g. in the form of a memory circuit. Persons skilled in the art will appreciate that the holding circuit may certainly be designed also as a component separate from the control unit. The holding circuit 29*a* is supplied by the control unit 29 with a default value which corresponds to the actual tensile stress acting on the load sensor 9. The default value is stored in the holding circuit 29*a* until the control unit 29 inputs a different default value in response to a change in the actual tensile stress acting on the load sensor 9. The default value is transmitted from the holding circuit 29*a* to the drive unit 28*a* of the lifting mechanism 28 for adjusting the lifting force applied by the lifting mechanism 28 in response to the default value.

At normal operation, the control unit 29 continuously receives from the load sensor 9 a signal commensurate with the tensile stress of the load sensor 9, as indicated by the broken line in FIG. 1. This signal is processed by the control unit 29 to generate the default value for input into the holding circuit 29*a* which registers the default value and at the same time transmits it to the drive unit 28*a* for making the necessary adjustments of the lifting force. The default value is stored in the memory of the holding circuit 29*a* until being replaced by a new default value as inputted by the control unit 29. Thus, as long as the tensile force on the load sensor 9 remains unchanged, the default value remains the same.

The switch 18 shown schematically in FIG. 1 allows a change of the holding circuit 29*a* from the operational mode "normal" to the operational mode "hold". In the hold mode, the stored default value is retained in the holding circuit 29*a* so that a further newly specified default value from the control unit 29 will be ignored until the switch 18 is actuated again to chose the normal operating mode of the holding circuit 29*a*. Thus, the lifting mechanism 28 maintains in the "hold" mode the lifting force according to the last inputted default, regardless of any change of the tensile stress of the load sensor 9.

Suitably, the switch 18 is a push switch with two switching states, namely "normal mode" and "hold mode" so that the holding circuit 29*a* can be switched between these modes.

Figure 6:
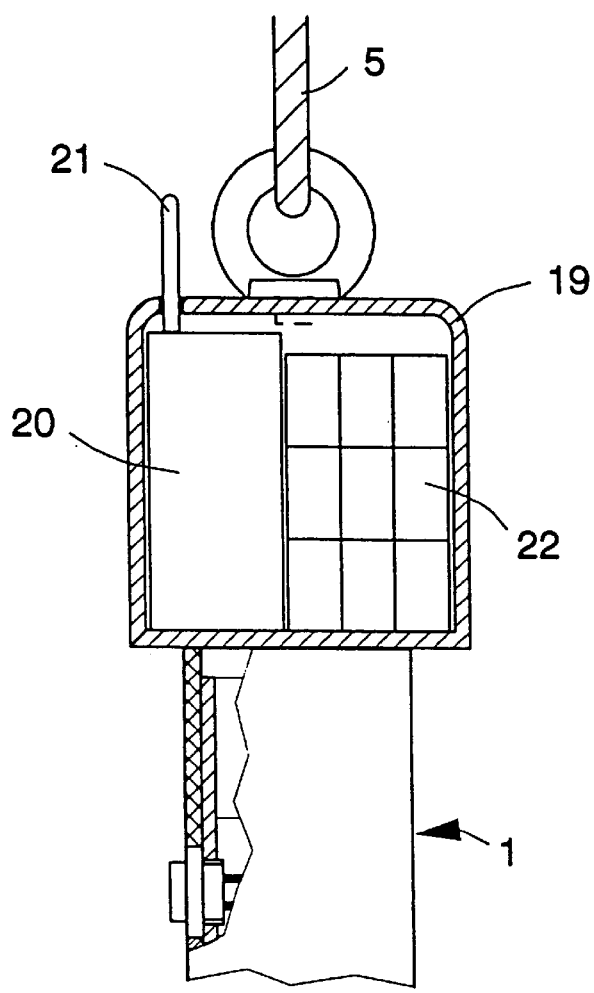
FIG. 6 is a detailed, partially sectional longitudinal view of another modification of the hoisting apparatus, illustrating in detail a radio transmission unit for signal transmission.

Turning now to FIG. 6, there is shown a partially sectional longitudinal view of a modification of the hoisting apparatus, illustrating in detail a radio transmission unit for transmitting the signal from the amplifier 16 to the control unit 29, e.g. via electromagnetic waves. The hollow body 2 supports on its upper end a casing 19 in which a transmitter 20 is housed and connected to an antenna 21. The transmitter 20 is supplied with electric energy by batteries 22. Electromagnetic waves emanating from the antenna 21 and propagating through the space are received by a receiver (not shown) which is part of the control unit 29 for operating the lifting mechanism 28 in response to the determination by the load sensor 9.

Figure 7:
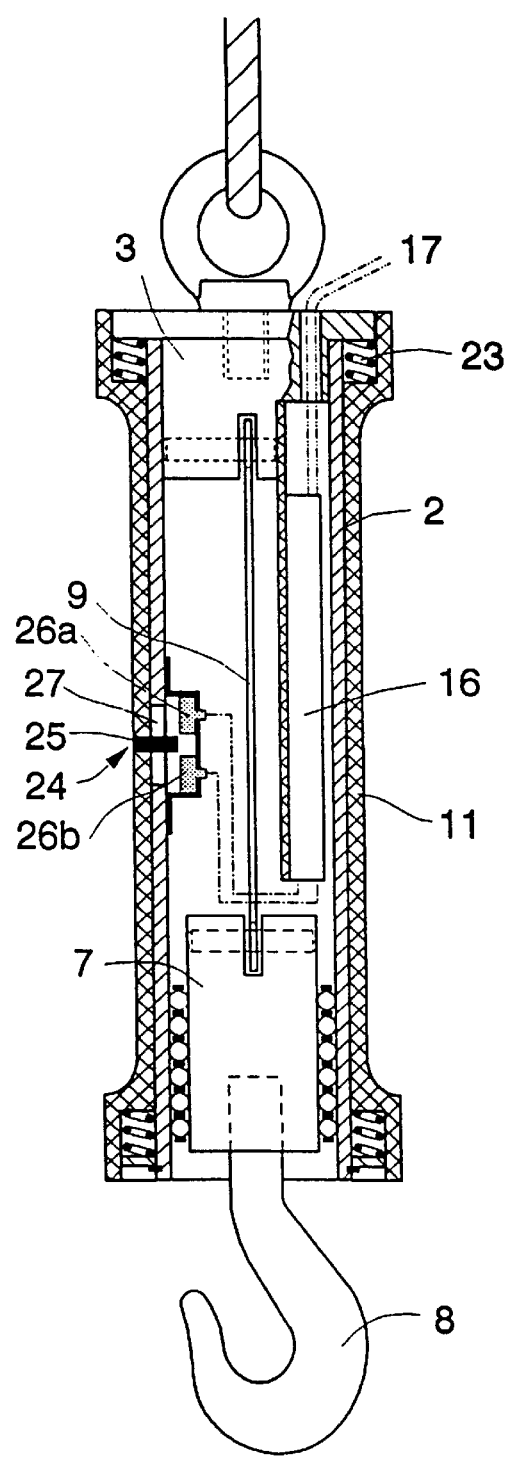
FIG. 7 is a fragmentary, partially sectional longitudinal view of another embodiment of a hoisting apparatus according to the present invention.

FIG. 7 shows a further embodiment of a hoisting apparatus according to the present invention in which the sheath 11 is slidingly supported relative to the hollow body 2 and cooperates with a switching mechanism, generally designated by reference numeral 24. The sheath 11 is so axially supported relative to the hollow body 2 by springs 23 that a center position is occupied by the sheath if no load is suspended from the hook 8. Projecting radially inwardly from the mid-section of the sheath 11 is an operating pin 25 which extends into an oblong hole 27 formed axially in the wall of the hollow body 2. In the path of the operating pin 25 are two spaced limit switches 26*a*, 26*b* which are secured to a mounting 30 attached to the inside wall of the hollow body 2. The limit switches 26*s*, 26*b* are operatively connected to the amplifier 16 via signal lines 31. When the sheath 11 occupies its central position relative to the hollow body 2, the operating pin 25 does not trigger any operation.

As soon as the operator grabs the handle 1 to lift e.g. a heavy load, the force applied by the operator may shift the sheath 11 to such an extent that the operating pin 25 is so moved in an upper direction as to trigger an actuation of the limit switch 26a and thereby instruct the lifting mechanism 28 to apply an increased lifting force. On the other hand, when the operator wishes to lower the load, the generated lifting force may be too high so that the sheath 11 may be shifted downwards to such an extent that the operating pin 25 triggers actuation of the limit switch 26b, resulting in a reduction of the lifting force. Actuation of the limit switches 26a, 26b is effected automatically without interference by the operator. Thus, in the event the operator wishes to move great masses in an easy manner and has to exert an increased manual force, the displacement of the sheath 11 automatically leads to an activation of this switching system to overcompensate the weight force.

It will be appreciated by persons skilled in the art that the switching system can be composed of a variety of conventional components that do not appear in the foregoing Figures, such as e.g. mechanically actuated microswitches, magnetic operating pin and Hall sensors, metallic operating pin and inductive sensors or the like.

While the invention has been illustrated and described as embodied in a load hoisting apparatus, it is not intended to be limited to the details shown since various modifications and structural changes may be made without departing in any way from the spirit of the present invention.

What is claimed as new and desired to be protected by Letters Patent is set forth in the appended claims:

1. A hoisting apparatus, comprising:
   a load-engaging member;
   a handle positioned above the load-engaging member for grabbing by an operator to manually move and guide a load;
   a lifting mechanism positioned above the handle and operatively connected to the handle via a flexible transmission member;
   a control unit for adjusting a lifting force of the lifting mechanism; and
   a load sensor accommodated in the handle and connected to the handle and the load-engaging member, said load sensor outputting to the control unit a signal commensurate with a tensile stress of the load sensor,
   said control unit so controlling the lifting mechanism that during lifting of the load the lifting force is increased in correspondence to an increasing tensile stress of the load sensor until the lifting force corresponds to a weight force of the load and the load is kept in suspension, and that the lifting force is decreased to zero in correspondence to a decreasing tensile stress of the load sensor when placing the load on a support surface.

2. The hoisting apparatus of claim 1, and further comprising a holding circuit operatively connected to the control unit for storing a default value for setting the lifting force applied by the lifting mechanism, said default value being inputted by the control unit commensurate with an actual tensile stress acting on the load sensor.

3. The hoisting apparatus of claim 2 wherein the holding circuit is selectively switchable back and forth between a first normal operating mode in which the control unit feeds the holding circuit with a continuously updated default value in accordance with a currently applied tensile stress, and a second hold operating mode in which the default value outputted last by the control unit is stored and retained in the holding circuit until switching to the first operating mode.

4. The hoisting apparatus of claim 3, and further comprising a switch mounted to the handle for selectively switching the holding circuit between the first and second operating modes.

5. The hoisting apparatus of claim 1 wherein the handle is defined by a longitudinal axis, said load sensor being received within the handle coaxially with the longitudinal axis to coincide with a line of action of the load.

6. The hoisting apparatus of claim 1 wherein the handle includes a hollow body which surrounds the load sensor.

7. The hoisting apparatus of claim 6 wherein the hollow body is a cylindrical pipe.

8. The hoisting apparatus of claim 6 wherein the handle includes a head piece securely fixed at an upper end of the hollow body, and a carriage arranged in proximity of the lower end of the hollow body for displacement in direction of the longitudinal axis relative to the hollow body, said load sensor extending between and secured to the head piece and the carriage.

9. The hoisting apparatus of claim 8 wherein the load sensor has opposing axial ends, with one axial end being articulated to the head piece and the other axial end being articulated to the carriage.

10. The hoisting apparatus of claim 8, and further comprising a bearing means received between the carriage and an inside wall of the hollow body for so guiding the carriage in the hollow body as to minimize friction.

11. The hoisting apparatus of claim 10 wherein the bearing means is a rolling-contact bearing.

12. The hoisting apparatus of claim 1, and further comprising a captivation means for preventing an expulsion of the carriage from the handle.

13. The hoisting apparatus of claim 12 wherein the captivation means is formed by a collar received in proximity of the lower end of the handle and so projecting radially inwards as to exhibit an inner diameter which is smaller than an outer diameter of the carriage.

14. The hoisting apparatus of claim 13 wherein the hollow body is formed with a circumferential groove, said collar being provided in the form of a ring received in the groove.

15. The hoisting apparatus of claim 1, and further comprising a safety mechanism for restricting a movement of the carriage into the handle to thereby prevent an upsetting of the load sensor.

16. The hoisting apparatus of claim 15 wherein the carriage exhibits a stop surface, said safety mechanism including a bolt traversing the hollow body and extending across the carriage in opposition to the stop surface at a small axial distance thereof.

17. The hoisting apparatus of claim 6 wherein the handle includes a sheath for enclosing the hollow body, said sheath being spring-loaded to allow a displacement of the sheath relative to the hollow body, and further comprising a switching mechanism triggered in response to an off-center displacement of the sheath relative to the hollow body for so adjusting the lifting force applied by the lifting mechanism as to compensate the off-center displacement.

18. The hoisting apparatus of claim 17 wherein the handle is formed with an oblong hole extending axially in the handle, said switching mechanism including an operating pin supported by the sheath and extending radially through the oblong hole, and a switch element actuated by the operating pin in response to an off-center displacement of the sheath.

19. A hoisting apparatus for allowing manual maneuvering of a load, comprising:
   a handle defining a longitudinal axis and including a hollow body surrounded by a sheath, said handle having an upper end configured as attachment for a flexible member and a lower end;

a lifting mechanism operatively connected to the flexible member; a load-engaging member;

a load sensor positioned between the lifting mechanism and the load-engaging member for transmitting a signal commensurate with a value of a load, said load sensor being received within said hollow body of the handle coaxially with the longitudinal axis to coincide with a line of action of the load;

a control unit receiving and processing the signal from the load sensor and outputting a control signal to the power unit for maintaining the load inbalance; and a switching mechanism for actuating the lifting mechanism in response to an off-center displacement of the sheath relative to the hollow body, said switching mechanism including an operating pin which projects into an oblong hole of the handle, and a pair of limit switches actuated by the operating pin when moving to an off-center position.

20. The hoisting apparatus of claim 19 wherein the hollow body is a cylindrical pipe.

21. The hoisting apparatus of claim 19 wherein the handle includes a head piece securely fixed at the upper end thereof, and a carriage linking the load-engaging member to the load sensor and guided within the hollow body in proximity to the lower end of the handle for displacement in direction of the longitudinal axis relative to the handle.

22. The hoisting apparatus of claim 21 wherein the load sensor has opposing axial ends, with one axial end being articulated to the head piece and the other axial end being articulated to the carriage.

23. The hoisting apparatus of claim 21, and further comprising a bearing means received between the carriage and an inside wall of the hollow body for so guiding the carriage within the hollow body of the handle as to minimize friction.

24. The hoisting apparatus of claim 23 wherein the bearing means is a rolling-contact bearing.

25. The hoisting apparatus of claim 21, and further comprising a captivation means for preventing an expulsion of the carriage from the handle.

26. The hoisting apparatus of claim 25 wherein the captivation means is formed by a collar received within the hollow body in proximity of the lower end of the handle and so projecting radially inwards as to exhibit an inner diameter which is smaller than an outer diameter of the carriage.

27. The hoisting apparatus of claim 26 wherein the hollow body is formed with a circumferential groove, said collar being provided in the form of a ring received in the groove.

28. The hoisting apparatus of claim 21, and further comprising a safety mechanism for restricting a movement of the carriage into the hollow body to prevent an upsetting of the sensor.

29. The hoisting apparatus of claim 28 wherein the carriage exhibits a stop surface, said safety mechanism including a bolt traversing the hollow body and extending across the carriage in opposition to the stop surface at a small axial distance thereof.

30. The hoisting apparatus of claim 19, and further comprising an amplifier accommodated in the hollow body for reinforcing the signal determined by the load sensor.

31. The hoisting apparatus of claim 19, and further comprising a switch secured to the handle for controlling the signal flow between the load sensor and the control unit.

32. The hoisting apparatus of claim 19 wherein the control unit includes a transmitter mounted to the handle for receiving the signal from the load sensor, and a receiver receiving a signal from the transmitter in a wireless manner.

33. The hoisting apparatus of claim 19 wherein the sheath is made of a polymer material exhibiting a non-slip surface profile.

34. The hoisting apparatus of claim 19 wherein the sheath is spring-loaded to allow a displacement of the sheath relative to the hollow body.

35. A hoisting apparatus for allowing manual maneuvering of a load, comprising:

a handle including a hollow body and having an upper end configured as attachment for a flexible member and a lower end;

a lifting mechanism operatively connected to the flexible member and applying a lifting force for elevating a load;

a load-engaging member;

a load sensor positioned between the lifting mechanism and the load-engaging member for transmitting a signal commensurate with a value of the load, said load sensor being received within the handle coaxially with the longitudinal axis to coincide with a line of action of the load, wherein said handle includes a head piece securely fixed at the upper end thereof, and a carriage linking the load-engaging member to the load sensor and guided within the hollow body in proximity to the lower end of the handle for displacement in a longitudinal direction relative to the handle;

a control unit receiving and processing the signal from the load sensor and outputting a control signal to the power unit for applying a force to lift the load and to keep the load in balance; and a safety mechanism for restricting a movement of the carriage into the hollow body to prevent an upsetting of the sensor, wherein the carriage exhibits a stop surface, said safety mechanism including a bolt traversing the hollow body and extending across the carriage in opposition to the stop surface at a small axial distance thereof.

* * * * *